United States Patent [19]

Fischer

[11] 4,075,310

[45] Feb. 21, 1978

[54] PRODUCTION OF SULFUR BY THE CLAUS PROCESS

[75] Inventor: Herbert Fischer, Lollar, Germany

[73] Assignee: Metallgesellschaft Aktiengesellschaft, Frankfurt am Main, Germany

[21] Appl. No.: 659,351

[22] Filed: Feb. 19, 1976

[30] Foreign Application Priority Data

Mar. 8, 1975 Germany .............................. 2510240

[51] Int. Cl.$^2$ .............................................. C01B 17/04
[52] U.S. Cl. ................................. 423/574 R; 423/238; 55/7 D
[58] Field of Search ...................... 423/238, 573, 574; 55/7 D; 56/68

[56] References Cited

U.S. PATENT DOCUMENTS

| 1,999,546 | 4/1935 | Pyzel ...................................... 55/7 D |
| 3,556,721 | 1/1971 | Radusch ............................... 423/238 |
| 3,819,816 | 6/1974 | Wunderlich et al. ........... 423/573 G |
| 3,957,960 | 5/1976 | Palm et al. ........................ 423/573 G |

*Primary Examiner*—G. O. Peters
*Attorney, Agent, or Firm*—Karl F. Ross

[57] ABSTRACT

In the Claus process for the production of sulfur a gas stream containing ammonia and hydrogen sulfide is treated to form a gas containing hydrogen sulfide and virtually no ammonia and a second gas which contains ammonia and is virtually free from hydrogen sulfide. The two gases are separately burned in the same Claus furnace with oxygen. To produce the gas virtually free from ammonia, a partial stream of the gas containing ammonia and hydrogen sulfide is scrubbed with water with the ammonia being recovered from the water.

4 Claims, 1 Drawing Figure

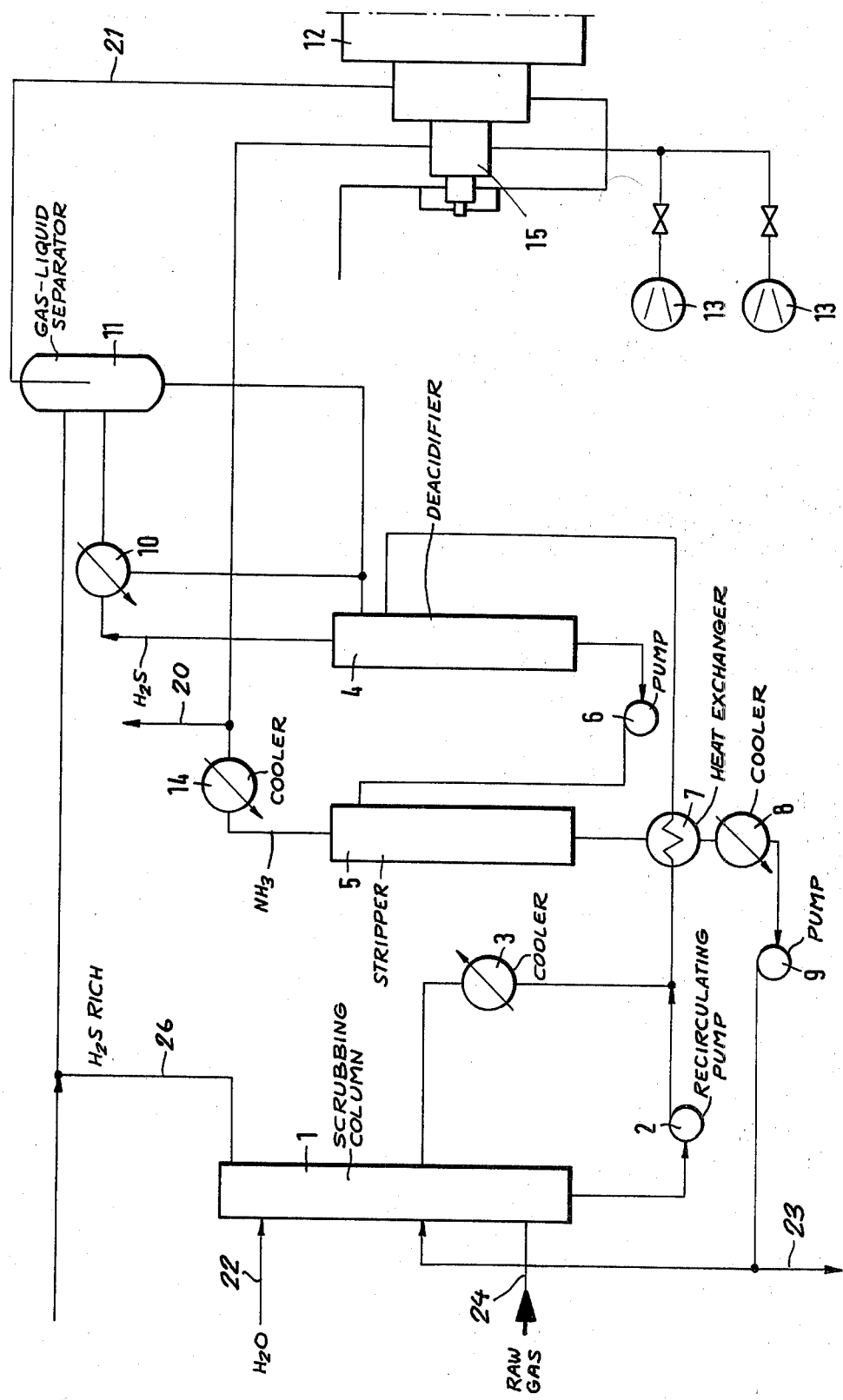

PRODUCTION OF SULFUR BY THE CLAUS PROCESS

FIELD OF THE INVENTION

The present invention relates to improvements in the Claus process for the production of elemental sulfur and, more particularly, for the production of sulfur by the Claus process from refinery and other waste gases containing ammonia ($NH_3$) and hydrogen sulfide ($H_2S$).

BACKGROUND OF THE INVENTION

Prior to the days of sensitivity with respect to environmental pollution, it was common practice to burn off refinery waste gases at flaming towers or the like or to simply discharge refinery gases into the atmosphere. These gases generally contain sulfur dioxide ($SO_2$) and $H_2S$, together with small amounts of ammonia. In recent years, however, recovery of these substances from the gases before they are discharged into the atmosphere has become a necessity and efforts have been made, therefore, to use the exhaust gases of petroleum refineries in the Claus process for the production of sulfur.

In the Claus process, hydrogen sulfide containing gases are oxidized in a Claus furnace to produce elemental sulfur and $SO_2$ in accordance with the equations $$H_2S + \tfrac{1}{2} O_2 = H_2O + S \qquad (1)$$

and $$2H_2S + 3 O_2 = 2H_2O + 2SO_2 \qquad (2)$$

The unreacted hydrogen sulfide not utilized in this reaction can be transformed to sulfur in one or more catalytic stages in accordance with the equation $$2 H_2S + SO_2 = 2H_2O = 3S \qquad (3)$$

These reactions are not fully effective if the Claus process gas contains ammonia. Thus, unless all ammonia is burned in the Claus process it tends to enter the downstream apparatus together with residual $H_2S$, and $SO_2$ so that salts such as ammonium sulfide, ammonium hydrogen sulfide, ammonium sulfite, ammonium hydrogen sulfite and the like form in the equipment and pipe networks. Such salts tend to deposit on cool surfaces of the plant; i.e. on the walls of the pipelines and the reactor, so that free flow of the gas is obstructed.

As the deposits increase, they eventually clog the flow cross section so that the plant eventually becomes inoperative and must be subject to a relatively long downtime as the solid deposits are removed.

Such clogging can be avoided as the ammonia is eliminated by being burned together with the hydrogen sulfide in the presence of a considerable excess of combustion air. However, this reaction, in accordance with equation (2), leads to the burning of more $H_2S$ to form $SO_2$ than is desired.

The overcombustion of $H_2S$ adversely affects the heat balance of the Claus process and disturbs the stoichiometric ratio required for reaction (3). In this reaction two moles of hydrogen sulfide are required to react with each mole of $SO_2$ in a reduction reaction to form elemental sulfur. When $H_2S$ is consumed in excess because of the need to burn off the ammonia, not only is the sulfur dioxide level increased, but the $H_2S$ level is reduced and hence the two to one stoichiometry required for reaction (3) cannot be maintained.

This has been recognized heretofore and hence it has been proposed to make up the deficit of reducing gas by adding water gas or coke-oven gases as additional reducing agents for the reduction of $NH_3$-containing gas.

These additional reducing agents transform part of the sulfur dioxide to $H_2S$ as described in German Pat. No. 884,352, thereby tending to restore the proper stoichiometry desired for reaction (3).

However, the addition of extraneous reducing agents as described in the latter patent has been found to be complicated and frequently unreliable being incapable of reproduction because of changing compositions of the reducing gases which are used.

Moreover, many of the reducing acids contain hydrocarbons and tend to form carbon black which deposits in the apparatus and eventually clogs and obstructs the latter, which tends to hinder the catalytic reaction by depositing upon the catalyst, and which tends to darken the color of the end product, i.e. the sulfur.

It has also been suggested (see German published application (Offenlegungsschrift) No. 2,122,000) to burn all of the gas containing the acid components and ammonia, oxidizing the gaseous constituents at elevated temperatures in the presence of a large excess of oxygen. This forms primarily sulfur dioxide, nitrogen and water vapor.

The resulting gas is subsequently combined with a gas which is free from ammonia and contains hydrogen sulfide, the proportions being selected so that $H_2S$ and $SO_2$ are present in molar ratio 2:1 which is stoichiometrically required to form sulfur as noted in connection with equation (3) above.

This process depends upon the availability of a gas stream which contains $H_2S$ and is free from $NH_3$ and which can be mixed with the gas stream containing sulfur dioxide. Refinery plants seldom have available such gases since practically all the waste gases of a refinery are more or less contaminated with ammonia. The separate production of a pure gas without extraneous components other than $H_2S$ is too expensive and uneconomical to be practical.

OBJECTS OF THE INVENTION

It is the principal object of the present invention to provide an improved Claus process for the production of elemental sulfur and whereby the aforementioned disadvantages are avoided.

Another object of the invention is to provide a process for the production of sulfur from low grade waste gases, especially the exhaust gases of refineries, which have hitherto been discarded or not visualized as a successful source of sulfur.

Another object of the invention is to provide a process for the treatment of gases containing hydrogen sulfide which is reliable and effective even when these gases are contaminated with ammonia.

Still another object of the invention is to provide an improved process for the production of sulfur which yields a light-colored and clean end product while using as the raw material a waste gas containing hydrogen sulfide and ammonia.

SUMMARY OF THE INVENTION

These objects and others which will become apparent hereinafter are attained, in accordance with the present invention, in a Claus process in which the gases are divided into a first gas stream which contains hydrogen sulfide and is virtually free from ammonia and a second gas stream which contains ammonia free hydrogen sulfide, and burning the gas streams separately in the same Claus furnace.

According to an essential feature of the invention, the raw gas stream containing $NH_2$ and $H_2S$ is scrubbed with water in a counterflow to remove $NH_3$ to a concentration of the latter in the gas which is below 100 parts per million (ppm), the water being recirculated through an absorbing column and a regenerating column. This yields the first gas stream containing $H_2S$ and virtually free from $NH_3$, for burning in the furnace with oxygen to produce sulfur in accordance with the Claus process as described.

Hydrogen sulfide is stripped from the scrubbing water laden with $NH_3$ and the $H_2S$ is then mixed with the first gas stream. The $NH_3$ from the scrubbing water is then also stripped out, cooled and is burned separately in the same Claus furnace with excess oxygen or air.

The invention thus comprises the steps of:
(a) washing a raw gas stream containing $H_2S$ and $NH_3$ (preferably as derived from a petroleum refinery) in counterflow with scrubbing water to solubilize $NH_3$ and part of the $H_2S$ in the water, while producing an $H_2S$-containing gas stream;
(b) scrubbing $H_2S$ from the water and mixing it with the $H_2S$-containing gas stream;
(c) thereafter stripping the ammonia from the scrubbing water to produce an ammonia-containing gas stream; and
(d) burning said $H_2S$-containing gas stream and said ammonia-containing gas stream separately in a common Claus furnace with oxygen or air, the $H_2S$-containing gas stream having an ammonia content of less than 100 ppm upon emergence from step (a).

According to a preferred feature of the invention the gas which contains $NH_3$ and $H_2S$ is scrubbed in two stages with a larger portion of the $NH_3$ being removed, by scrubbing with water which is recirculated through an adsorbing column and a regenerating column, the balance of the ammonia being removed by scrubbing in the second stage with fresh water (not recirculated) which is then discharged. Advantageously, both gas streams (i.e. the first gas stream containing $H_2S$ and virtually free from ammonia and the second gas stream containing ammonia and virtually free from $H_2S$) are introduced into the Claus plant at temperatures below 40° C.

If the treated gas which is free from $NH_3$ has a sufficiently high $H_2S$ content the scrubbing agent is regenerated in one stage and the $H_2S$-containing vapors and the $NH_3$-containing vapors are fed to the Claus plant together with excess air. The $H_2S$ content will be sufficiently high if the lower limit of the molar ratio $H_2S:SO_2$ is 2:1.

We have found that gases of any composition, independent of their ammonia and hydrocarbon contents can be processed in accordance with the invention which burns the ammonia gas separately without disturbing the heat balance of the Claus process and without causing the formation of excess $SO_2$.

Thus the Claus process as modified by the principles set forth above, can be carried out as if the gases contained only $H_2S$ and at lower temperatures without the formation of carbon black, without the need for additional hydrogenating gases which might contain carbon monoxide or hydrocarbons and promote the formation of carbonyl sulfide and bituminous sulfur.

BRIEF DESCRIPTION OF THE DRAWING

The above and other objects, features and advantages of the present invention will become more readily apparent from the following description, reference being made to the accompanying drawing in which the sole FIGURE is a flow diagram illustrating the invention.

SPECIFIC DESCRIPTION

In FIG. 1 I show a scrubbing column 1 to which the recirculating liquid can be fed by a recirculating pump 2 and a cooler 3.

A portion of the liquid can pass through one compartment of a heat exchanger 7 before entering a deacidifier 4 from which the liquid phase can be displaced by a pump 6 into a stripper 5. A cooler 14 cools the gas emerging from the stripper before it enters the burner 15 of a Claus furnace 12, excess ammonia-containing gas being removed from the system as represented by line 20.

The liquid phase from the stripper passes through the heat exchanger 7 and a cooler 8 before being recycled by a pump 9 to the scrubbing column 1.

The gas phase from the deacidifier is fed through a cooler 10 to a gas-liquid separator while the liquid phases from this separator and from the condenser 10 are returned to the deacidifier 4. Blowers 13 feed air to the burner 15 which also receives the gas phase from the gas-liquid separator as represented by the line 21. Makeup water can be supplied to the column at line 22, excess liquid can be withdrawn as shown at line 23 and the raw gas can be introduced into the scrubbing column 1 at line 24.

The system is operated as follows:

the gas mixture containing hydrogen sulfide and ammonia and derived, for example, from a refinery, saturated with 80 to 90% of saturation with water vapor, is supplied to the scrubbing column 1 at 24. The larger part of the ammonia is scrubbed out of this gas with water at a temperature of 20° to 25° C, the scrubbing being carried out in two stages, namely, a bottom stage and an upper state. The final scrubbing is effected in the upper portion of the scrubbing column with fresh water introduced at 22. The lower portion of the scrubbing column is designed so that water is fed by a recirculating pump 2 several times through a packed bed so that substantially all of the ammonia is removed by the liquid phase. The heat of reaction of absorption and solution is dissipated by the heat exchanger 3 which is supplied with a suitable coolant. During absorption of $NH_3$ a corresponding amount of hydrogen sulfide and of carbon dioxide are removed.

The gases emerging at 26 are relatively rich in hydrogen sulfide although containing some $NH_3$ depending on the scrubbing temperature and the water throughput. This gas is mixed with $H_2S$ free from $NH_3$ as will be explained below.

The ammonia containing water is regenerated in a deacidifier 4 which drives the $H_2S$ gas from the water, the gas passing through a condenser 10 and entering the liquid separator 11. This $H_2S$ gas mixes with the gas from line 26 in the gas-liquid separator 11.

The scrubbing liquid, now free from $H_2S$, is displaced by pump 6 to a stripper 5 in which the ammonia is driven off and passes through the cooler 14 before entering the burner 15.

The scrubbing liquid passes through the heat exchanger 7 and an aftercooler 8 and is displaced by pump 9 to the top of the first stage of the scrubbing column 1. The $H_2S$ stream, substantially free from $NH_3$ is fed to the burner 15 of the combustion chamber 12 and is reacted with oxygen independently of the ammonia containing gas. The air required for combustion is fed to the burner by blowers 13. During the combustion, the ammonia is transformed into $N_2$ and $H_2O$. Any nitrogen oxides and sulfur trioxides formed in the combustion with excess air are decomposed in the reducing atmosphere of the combustion chamber. The burner 15 for the ammonia containing gas and the hydrogen sulfide containing gas may be so constructed that the $H_2S$ containing gas is burned in a plurality of burners arrayed in a ring around a central $NH_3$ burner. The air required for the combustion of the $NH_3$ gas can be controlled by a proportional control system. The air required for the remaining gas is also coarse-controlled by a proportional control system and may be finely controlled by an additional automatic control system receiving control signals from a gas chromatograph or analyzer which measures the molar ratio $H_2S:SO_2$ to maintain the same at a value of 2:1.

EXAMPLE

An $NH_3$-containing Claus gas consisting of

| | | |
|---|---|---|
| 214 standard $m^3$ $H_2S/h$ | = | 91.453% by volume |
| 13 standard $m^3$ $NH_3/h$ | = | 5.555% by volume |
| 2 standard $m^3$ $CO_2/h$ | = | 0.855% by volume |
| 5 standard $m^3$ $H_2O/h$ | = | 2.137% by volume |
| 234 standard $m^3/h$ | | 100.000% by volume | is scrubbed at ambient temperature with a scrubbing agent consisting of water which is recirculated at a rate of 0.5 $m^3/h$ through the gas scrubber and regenerator and is subsequently scrubbed with 0.1 $m^3/h$ fresh water to a residual content of 3 ppm $NH_3$.

The gas leaving this scrubber is admixed to a Claus gas stream, which flows at a rate of 355 standard $m^3/h$ and is free from $NH_3$. This gas consists of
50.7% by volume $H_2S$
43.5% by volume $CO_2$
0.5% by volume $CH_4$
0.2% by volume $C_2H_6$
5.1% by volume $H_2O$
The hydrogen sulfide stripped off by the regeneration of the spent scrubbing solution in the deacidifier is admixed at a rate of about 13 standard $m^3/h$ to said mixed gas, which is then fed to the Claus process plant, in which it is burnt and reacted with 1560 standard $m^3/h$ air with formation of sulfur.

The ammonia which is stripped at a rate of about 20 kg/h in the ammonia stripper from the $H_2S$ after the deacidification of the spent scrubbing water is burnt with excess air in a separate burner provided on the claus furnace with formation of $N_2$ and $H_2O$.

I claim:

1. In a Claus process for the production of sulfur from a raw gas which is poor in ammonia and consisting essentially of hydrogen sulfide, such as a gas from refinery plants, by scrubbing the gas with water to remove $NH_3$ and $H_2S$ therefrom, separating the $NH_3$ and $H_2S$ and producing a gas stream rich in $H_2S$ and another gas stream rich in $NH_3$, subjecting the first and the second gas streams separately to combustion and cooling the combustion gases, the improvement which comprises:
  (a) scrubbing the $H_2S$ and $NH_3$-containing raw gas which is saturated with water vapor in two stages consisting of a bottom stage and a top stage, recirculating the scrubbing water repeatedly through only said bottom stage to remove most of the $NH_3$ from the raw gas in order to reach a high absorption rate and thereafter finally scrubbing the raw gas with fresh water in an open circuit in the top stage whereby the latter water then passes into the bottom stage without recirculation to remove the remainder of the $NH_3$ therefrom to a residual content of less than 100 ppm $NH_3$ and dissipating the heat of reaction and solution by a heat exchanger supplied with coolant;
  (b) deriving a gas rich in $H_2S$ and containing less than 100 ppm of $NH_3$ therein;
  (c) driving $H_2S$ from the scrubbing water of step (a) liberated from $H_2S$ and cooling the formed $NH_3$ and forming a second gas rich in $HH_3$;
  (d) recirculating the scrubbing water which is free of $H_2S$ and $NH_3$ to the top of the bottom stage of the scrubbing column; and
  (e) feeding the first mainly $H_2S$-containing gas and the second mainly $NH_3$-containing gas streams of steps (b) and (c) respectively into the same Claus plant furnace with temperatures of below 40° C and burning said gases separately with air or oxygen, the second gas being burned with an excess of oxygen to maintain a ratio of $H_2S/SO_2$ at a value of about 2 to 1 to produce elemental sulfur therefrom.

2. The process defined in claim 1 further comprising the step of combining the $H_2S$ driven from the scrubbing water during step (c) with the stream rich in $H_2S$ derived in step (b).

3. A method of producing sulfur from a raw gas consisting predominantly of $H_2S$ and a minor quantity of $NH_3$ which comprises the following steps:
  (a) scrubbing the gas with a circulated $NH_3$-absorbent to partially remove $NH_3$ therefrom, and then cooling the circulated absorbent;
  (b) scrubbing the gas resulting from step (a) with fresh $NH_3$-absorbent to remove the remainder of the $NH_3$ to derive a gas rich in $H_2S$;
  (c) admitting the $NH_3$-absorbent after use during the scrubbing step (b) to the scrubbing step (a);
  (d) separating any liquid from the gas rich in $H_2S$ derived in step (b) and burning same free from $NH_3$ to produce sulfur;
  (e) withdrawing a portion of the circulated absorbent of step (a) and stripping $NH_3$ therefrom to produce a gas rich in $NH_3$; and
  (f) burning the gas rich in $NH_3$ separately from the gas rich in $H_2S$ burned in step (d).

4. The process defined in claim 3 further comprising the steps of:
  (g) driving additional $H_2S$ from the portion of the circulated absorbent withdrawn in step (e); and
  (h) combining the $H_2S$ driven from the circulated absorbent in step (g) with the gas rich in $H_2S$ derived in step (b).

* * * * *